Nov. 11, 1958 A. F. VERKRUISSEN 2,860,261
DEVICE FOR SUPPLYING A SIGNAL TO ONE OF A PLURALITY OF OUTPUT CONDUCTORS
Filed Feb. 18, 1957
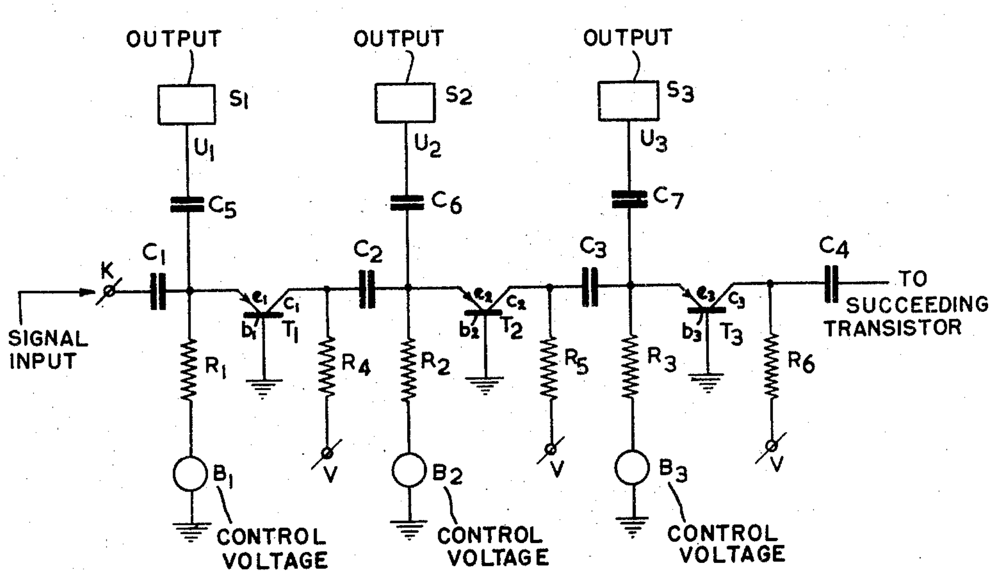
INVENTOR
ARIE FERDINAND VERKRUISSEN
BY
AGENT

United States Patent Office 2,860,261

Patented Nov. 11, 1958

2,860,261

DEVICE FOR SUPPLYING A SIGNAL TO ONE OF A PLURALITY OF OUTPUT CONDUCTORS

Arie Ferdinand Verkruissen, Eindhoven, Netherlands, assignor to North American Philips Company, Inc., Irvington on Hudson, N. Y.

Application February 18, 1957, Serial No. 640,788

Claims priority, application Netherlands March 3, 1956

1 Claim. (Cl. 307—88.5)

The invention relates to a device for supplying a signal to one of a plurality of output conductors with the aid of a chain of voltage-controlled change-over contacts.

Such devices may be used, for example, in indication arrangements for automatic telephone systems to occupy a free apparatus, for example, a register or a call finder and the like. In this case use is often made of a chain of change-over contacts, the working contacts of each of which are connected to the moving part of the next-following change-over contact, the change-over contacts being controlled by means of relays.

The invention provides a device in which the change-over contacts are of the electronic type. The device according to the invention comprises a chain of transistors, of which the collector electrodes are connected to the emitter electrode of the next-following transistors, the signal being supplied to the emitter of the first transistor of the chain. The output conductors are connected to the emitter electrodes and the base electrodes are connected to circuits having a low impedance for the signal voltage. The control-voltages operate between the emitter and base electrodes of the various transistors in a manner such that, in the conductive state of a transistor, the emitter-base circuit constitutes a short-circuit for the signal and the transistor carries the signal to the emitter of the next-following transistor, whereas, in the non-conductive state of the transistor, a signal voltage is obtained from the output conductor connected to the emitter electrode.

The invention will be described more fully with reference to one embodiment shown diagrammatically in the drawing.

The chain arrangement shown is constituted by a chain of transistors T1, T2, T3 of the pnp-type. The collector electrodes *c*1, *c*2, *c*3 are connected through capacitors C1, C2, C3 to the emitter electrodes *e*2, *e*3 of the next-following transistor in the chain. The emitter electrodes *e*1, *e*2, *e*3 are connected via resistors R1, R2, R3 to sources B1, B2 and B3 of control-voltages, whereas the collector electrodes *c*1, *c*2 and *c*3 are connected to a voltage source V, the voltage of which is negative to earth. The base electrodes *b*1, *b*2, *b*3 are connected to earth. The output conductors U1, U2 and U3 are coupled via capacitors C5, C6 and C7 with the emitter electrodes *e*1, *e*2 and *e*3. This arrangement operates as follows.

If the control-voltages of the sources B1, B2 and B3 are negative to earth, the transistors T1, T2 and T3 are cut off. If a signal, for example, a pulse, is supplied to the input terminal K of the chain, this signal is transferred via the capacitors C1 and C5 and the output conductor U1 to the signal receiver or output S1. If, on the contrary, the control-voltage of the source B1 has a positive value to earth, the blocking layer between the emitter electrode *e*1 and the base electrode *b*1 is conductive, so that it constitutes a short-circuit to earth and the capacitor C5 does not transfer a signal to the signal receiver S1. The signal current passing through the said blocking layer will be amplified in known manner by the transistor, so that the signal voltage will appear at the collector electrode *c*1, from which it will be transferred via the capacitors C2 and C6 and the output conductor U2 to a signal receiver S2. If the voltage of the source B2 had been positive to earth, the blocking layer between the emitter electrode *e*2 and the base electrode *b*2 would have been conductive in a corresponding manner and have formed a short-circuit for the signal voltage to earth and the signal receiver S2 would not have received a signal. The transistor T2 would then have passed the signal and via the capacitors C3 and C7 and the output conductor U3 supplied it to the signal receiver S3.

The device may be varied in various ways within the scope of the invention.

For example, the control-voltage source may be included in the base circuit of the transistors, instead of being included in the emitter circuit, if care is taken that the internal resistance of the base circuits is sufficiently low, which may for example be realized by shunting the control-voltage sources by means of capacitors.

What is claimed is:

A circuit arrangement for supplying a signal to one of a plurality of output conductors by means of a chain of voltage-controlled change-over contacts, comprising: a chain of transistors each of which has an emitter electrode, a base electrode and a collector electrode, said chain of transistors being connected with the collector electrode of each transistor coupled to the emitter electrode of the next-following transistor, means for supplying a signal voltage to the emitter electrode of the first transistor of the chain, a plurality of output conductors each of which is connected to the emitter electrode of each transistor, the base electrode of each transistor being connected to a circuit having a low impedance for said signal voltage, means for supplying a control voltage between the emitter and the base electrodes of each transistor, the polarity of each of said control voltages determining the conductive state of the respective transistor, the emitter-base circuit of each transistor constituting a short circuit for said signal voltage and allowing said signal voltage to be passed by the transistor when it is in the conductive state, the signal voltage being supplied to the respective output conductor when the transister is in its non-conductive state.

No references cited.